United States Patent [19]

Layer et al.

[11] Patent Number: 5,554,699
[45] Date of Patent: Sep. 10, 1996

[54] METHOD OF CURING RUBBERS WITHOUT FORMING NITROSAMINES

[75] Inventors: Robert W. Layer, Stow; Dwight W. Chasar, Northfield, both of Ohio

[73] Assignee: The B. F. Goodrich Company, Akron, Ohio

[21] Appl. No.: 268,143

[22] Filed: Jun. 28, 1994

Related U.S. Application Data

[63] Continuation of Ser. No. 958,395, Oct. 8, 1992, abandoned.

[51] Int. Cl.$^6$ .................................................. C08C 19/00
[52] U.S. Cl. .................................. 525/332.7; 525/332.5; 525/332.6
[58] Field of Search ........................... 525/332.5, 332.6, 525/332.7

[56] References Cited

U.S. PATENT DOCUMENTS

| | | |
|---|---|---|
| 3,417,086 | 12/1968 | Smith, Jr. et al. |
| 3,426,003 | 2/1969 | Leib et al. |
| 3,678,135 | 7/1972 | Mastromatteo et al. ............ 260/889 |
| 3,686,214 | 8/1972 | Morita. |
| 3,751,401 | 8/1973 | D'Amico. |
| 3,852,251 | 12/1974 | Maxey. |
| 3,855,192 | 12/1974 | Rodger. |
| 3,910,864 | 10/1975 | Son. |
| 4,017,439 | 4/1977 | Beadle et al. |
| 4,119,588 | 10/1978 | Carpino. |
| 4,237,247 | 12/1980 | Matoba et al. ............ 524/576 |
| 4,496,683 | 1/1985 | Morita. |
| 5,070,130 | 12/1991 | Chasar. |

FOREIGN PATENT DOCUMENTS

| | | |
|---|---|---|
| 242432 | 10/1987 | European Pat. Off. |
| 479526 | 4/1992 | European Pat. Off. |
| 562750 | 9/1993 | European Pat. Off. |
| 2107447 | 10/1972 | France. |
| 2185022 | 12/1973 | France. |
| 711586 | 7/1954 | United Kingdom. |

OTHER PUBLICATIONS

European Search Report for application 93111252.8 dated Apr. 29, 1994.

Kautschuk und Gummi Kunstoffe, vol. 42, No. 1, Jan. 1989, Heidelberg, pp. 31–33, D. W. Chasar "A New Thiocarbamyl Sulfenamide Accelerator".

*Primary Examiner*—Edward Cain
*Attorney, Agent, or Firm*—Mary Ann Tucker; Samuel B. Laferty

[57] ABSTRACT

Branched and cyclic N,N-dialkyldithiocarbamyl accelerators for the sulfur vulcanization of rubber have been found to generally perform as well as the corresponding straight chain N,N-dialkyldithiocarbamyl accelerators, but surprisingly do not produce detectable amounts of environmentally undesirable N-nitrosamines.

The branched N,N-alkyldithiocarbamyl accelerators are generally represented by the formula:

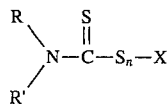

where R is a branched alkyl group, R' is an alkyl group which may or may not be branched or a cyclic alkyl group or an alkaryl or aryl group, X is another thiocarbamyl group of the same general structure, a primary alkylamino group, an alkylthio group, a 2-benzothiazyl group, or a metal ion, and n is an integer of from 1 to 6.

The cyclic dithiocarbamyl accelerators of the invention are generally represented by the formula

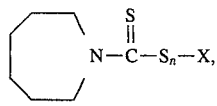

where X is another thiocarbamyl group of the same general structure, a primary alkylamino group, an alkylthio group, a 2-benzothiazyl group, or a metal ion, and n is an integer of from 1 to 6.

36 Claims, No Drawings

METHOD OF CURING RUBBERS WITHOUT FORMING NITROSAMINES

This application is a continuation of application Ser. No. 07/958,395, filed on Oct. 8, 1992 now abandoned, by Robert Layer et al., for METHOD OF CURING RUBBERS WITHOUT FORMING NITROSAMINES.

FIELD OF THE INVENTION

The invention relates to an improved process and accelerator system for vulcanizing rubber and, more particularly, the invention relates to an accelerator system wherein the formation of nitrosamines is substantially eliminated.

BACKGROUND OF THE INVENTION

Rubber compounds are typically vulcanized using various amine containing accelerators such as sulfenamides, thiocarbamyl sulfenamides, thiuram mono- or disulfides, dithiocarbamates, etc. These accelerators are generally based on secondary di-n-alkylamines and aliphatic cyclic amines which are known to generate high amounts of the corresponding N-nitrosodialkylamines. Recent worldwide environmental concerns have stimulated efforts toward finding suitable alternative accelerator systems for abating or eliminating the formation of N-nitrosodialkylamines during the vulcanization of rubber products.

Although a wide variety of thiuram disulfides, based on secondary amines, have been found to be accelerators, none have been shown to provide for excellent curing characteristics without the formation of N-nitrosamines.

The use of alkaline earth oxides and hydroxides in conjunction with secondary amine containing accelerators and conventional vulcanizing agents to reduce nitrosamine levels by at least 20 percent and up to as much as 95 percent has been disclosed by U.S. Pat. No. 5,070,130 to Chasar.

SUMMARY OF THE INVENTION

It has unexpectedly been discovered that dithiocarbamyl compounds derived from dialkylamines, wherein at least one of the alkyl groups is branched or wherein the two alkyl groups along with the nitrogen of the dialkylamine form a seven member ring, can be used as accelerators for the sulfur vulcanization of rubber without the formation of environmentally undesirable nitrosamine compounds.

In accordance with one aspect of the invention, the sulfur vulcanization accelerators are generally characterized by the following formula:

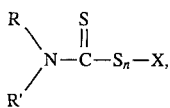

wherein X is a second thiocarbamyl group of the same general structure, a primary amino group, an alkylthio group, a 2-benzothiazyl group, or a metal ion, R and R' are each independently a branched alkyl group having from 3 to about 8 carbon atoms, preferably from 3 to 6 carbon atoms, and more preferably 3 or 4 carbon atoms, or a linear alkyl group having from 1 to about 8 carbon atoms, preferably from 1 to 4 carbon atoms, and more preferably 1 or 2 carbon atoms, or a cyclic alkyl group having from 5 to about 12 carbon atoms and preferably from 5 to 6 carbon atoms, or an alkaryl or aryl group having from 6 to about 12 carbon atoms, and more preferably 6 or 7 carbon atoms, provided that at least one of the groups selected from R and R' is a branched alkyl, and n is an integer up to 6 and preferably 1 or 2.

In accordance with another aspect of the invention, the sulfur vulcanization accelerators are generally characterized by the formula:

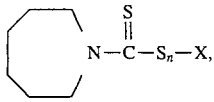

wherein X is a second thiocarbamyl group of the same general structure, a primary amino group, an alkylthio group, a 2-benzothiozyl group, or a metal ion, and n is an integer up to 6 and preferably 1 or 2.

The accelerators of the invention, in addition to substantially eliminating the formation of nitrosamines, have excellent curing characteristics such as cure rate and scorch safety and produce a vulcanizate having good physical properties such as stress-strain properties and aging properties. The branched dialkyldithiocarbamyl accelerators of the invention can be used as the sole accelerator during the vulcanization of sulfur curable rubber compositions or may be used in combination with conventional accelerators such as mercaptobenzothiazole and its derivatives to provide an accelerator system having a desirable balance of low cost, low nitrosamine formation, good curing characteristics and good vulcanizate properties.

In accordance with a particularly preferred aspect of the invention, it has been unexpectedly found that N,N,N',N'-tetraisobutylthiuram monosulfide, when used with mercaptobenzothiazole or its derivatives as vulcanization accelerators, in addition to eliminating nitrosamine formation, acts as a retarder and increases scorch safety.

DESCRIPTION OF THE PREFERRED EMBODIMENTS

Generally, the branched dialkyldithiocarbamyl accelerators of the invention can be used in sulfur vulcanizable natural rubber, any sulfur vulcanizable synthetic rubber, or in mixtures thereof. Natural diene rubbers which can be used in association with the invention include Hevea rubber, guayule, and other naturally occurring elastomers. Synthetic polymers which can be used with the accelerators of the invention include polymers and copolymers made from conjugated dienes generally having from 4 to 12 carbon atoms, with specific examples including butadiene, isoprene, pentadiene, hexadiene, heptadiene, octadiene, 2,3-dimethyl-1,3-butadiene, 2-methyl-1,3-pentadiene, and the like, homopolymers or copolymers of conjugated diene monomers with one or more comonomers such as styrene, alpha-methylstyrene, vinyl toluene, acrylnitrile, isobutylene, or carboxylic acids and esters such as maleic, fumaric, itaconic, acrylic and methacrylic acids, and methylmethacrylate. Block copolymers such as diblock and triblock, as well as various graft copolymers of the above can also be utilized such as polystyrene-butadiene, acrylonitrile-butadiene, and the like. Other synthetic polymers which can be utilized include ethylene-propylene terpolymers (EPDM) such as ethylene propylene and dicyclopentadiene, 1,4-hexadiene or ethylidene terpolymers; and chlorinated polymers which possess unsaturation such as polychloroprene, and the like.

Conventional crosslinking or vulcanization agents suitable for use with the invention include elemental sulfur and certain sulfur-donating organic compounds which are capable of crosslinking vulcanizable rubber. Examples of organic sulfur-donating compounds which can be used include caprolactam disulfide, alkyl phenol disulfides, thiuram di- and polysulfides, and thiocarbamyl sulfenamides. The sulfur-donating agent is employed at levels ranging from about 0.1 parts to 8 parts by weight per 100 parts by weight of sulfur vulcanizable rubber. More preferably, the level of sulfur-donating agent is from about 1 to 4 parts by weight. Sulfur is the preferred crosslinking agent; however, an organic sulfur-donating agent can be used alone or with sulfur. The amount and type of sulfur-donating agent and/or sulfur used is primarily dependent on the properties desired in the vulcanized rubber and can be readily ascertained without undue experimentation by those skilled in the art.

The branched dialkyldithiocarbamyl accelerators in accordance with one aspect of the invention are characterized by the general formula:

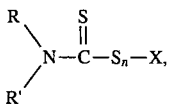

wherein X is a second thiocarbamyl group of the same general structure, a primary amino group, an alkylthio group, a 2-benzothiazyl group, or a metal ion, R and R' are each independently a branched alkyl group having from 3 to about 8 carbon atoms, preferably from 3 to 6 carbon atoms, and more preferably 3 or 4 carbon atoms, or a linear alkyl group having from 1 to about 8 carbon atoms, preferably from 1 to 4 carbon atoms, and more preferably 1 or 2 carbon atoms, or a cyclic alkyl group having from 5 to about 12 carbon atoms and preferably from 5 to 6 carbon atoms, or an alkaryl or aryl group having from 6 to about 12 carbon atoms, and more preferably 6 or 7 carbon atoms, provided that at least one of the groups selected from R and R' is a branched alkyl, and n is an integer up to 6 and preferably 1 or 2.

More particularly, when X is another thiocarbamyl, a first category of accelerators in accordance with the invention are the thiuram mono-, disulfides and polysulfides represented by the formula:

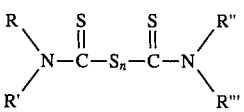

wherein each of R, R', and R" and R'" is independently a branched alkyl group having from 3 to about 8 carbon atoms, preferably from 3 to 6 carbon atoms and more preferably 3 or 4 carbon atoms, or a linear alkyl group having from 1 to about 8 carbon atoms, preferably from 1 to 4 carbon atoms and more preferably 1 or 2 carbon atoms, or a cyclic alkyl group having from 5 to about 12 carbon atoms and preferably from 5 to 6 carbon atoms, or an alkaryl or aryl group having from 6 to about 12 carbon atoms, preferably from 6 to about 9 carbon atoms and more preferably 6 or 7 carbon atoms, provided that at least one of the groups attached to each nitrogen is a branched alkyl group, and n is an integer up to 6 and preferably 1 or 2.

Examples of thiuram mono- or disulfide accelerators in accordance with the invention include:
N,N'-di-n-butyl-N,N'-diisoamylthiuram monosulfide
N,N'-diethyl-N,N'-diisobutylthiuram disulfide
N,N'-dimethyl-N,N'-diisopropylthiuram monosulfide
N,N,N'N'-tetraisopropylthiuram monosulfide
N,N,N'N'-tetraisopropylthiuram disulfide
N,N,N',N'-tetraisobutylthiuram disulfide
N,N,N',N'-tetraisobutylthiuram monosulfide
N,N'-dibenzyl-N,N'-diisopropylthiuram monosulfide
N,N'-diisobutyl-N,N'-diphenylthiuram disulfide and
N,N'-diisobutyl-N,N'-dicyclohexylthiuram disulfide In accordance with a particularly preferred aspect of the invention, it has been unexpectedly discovered that, contrary to typical thiuram disulfides which, when added to benzothiazole accelerators to increase cure rate also tend to decrease scorch safety, N,N,N',N'-tetraisobutylthiuram monosulfide can be used with mercaptobenzothiazole or its derivatives to accelerate cure without forming nitrosamines and also, surprisingly, act as retarders and increase scorch safety.

When X is a primary amino group, a second category of accelerators in accordance with the invention are the various thiocarbamyl sulfenamides represented by the formula:

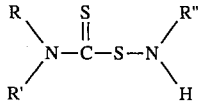

wherein each of R and R' is independently a branched alkyl group having from 3 to about 8 carbon atoms, preferably from 3 to 6 carbon atoms and more preferably 3 or 4 carbon atoms, or a linear alkyl group having from 1 to about 8 carbon atoms, preferably from 1 to 4 carbon atoms and more preferably 1 or 2 carbon atoms, or a cyclic alkyl group having from 5 to about 12 carbon atoms and preferably from 5 to 6 carbon atoms, or an alkaryl or aryl group having from 6 to about 12 carbon atoms, preferably from 6 to about 9 carbon atoms and more preferably 6 or 7 carbon atoms, provided that at least one of the groups selected from R and R' is a branched alkyl, and R" is hydrogen, or an alkyl, alkaryl or aryl group as set forth for R and R'.

Examples of thiocarbamyl sulfenamide accelerators which can be used in accordance with the invention include:
N,N-diisoamylthiocarbamyl-N'-cyclohexyl sulfenamide
N,N-diisobutylthiocarbamyl-N'-cyclohexyl sulfenamide
N,N-diisopropylthiocarbamyl-N'-phenyl sulfenamide
N,N,N'-triisopropylthiocarbamyl sulfenamide
N,N,N'-triisobutylthiocarbamyl sulfenamide
N,N-diisopropylthiocarbamyl-N'-t-butyl sulfenamide and
N,N-diisobutylthiocarbamyl-N'-t-butyl sulfenamide.

A third category of accelerators according to the invention, when X is an alkylthio group, are the alkylthiodithiocarbamates represented by the formula:

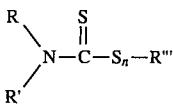

wherein each of R, R', and R'" is independently a branched alkyl group having from 3 to about 8 carbon atoms, preferably from 3 to 6 carbon atoms and more preferably 3 or 4 carbon atoms, or a linear alkyl group having from 1 to about 8 carbon atoms, preferably from 1 to 4 carbon atoms and more preferably 1 or 2 carbon atoms, or a cyclic alkyl group having from 5 to about 12 carbon atoms and preferably from 5 to 6 carbon atoms, or an alkaryl or aryl group having from 6 to about 12 carbon atoms, preferably from 6 to about 9 carbon atoms and more preferably 6 or 7 carbon atoms, provided that at least one of the groups attached to the nitrogen is a branched alkyl group, and n is an integer up to 6, preferably 1 or 2.

Examples of alkylthiocarbamate accelerators which can be utilized in accordance with the invention include:

cyclohexyl N,N-diisopropyldithiocarbamyl disulfide
cyclohexyl N,N-diisobutyldithiocarbamyl disulfide
t-butyl N,N-diisopropyldithiocarbamyl disulfide and
t-butyl N,N-diisobutyldithiocarbamyl disulfide.

When X is a 2-benzothiazyl group, a fourth category of accelerators in accordance with the invention are dithiocarbamylbenzothiazoles represented by the formula

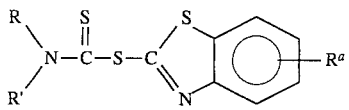

wherein each of R and R' is independently a branched alkyl group having from 3 to about 8 carbon atoms, preferably from 3 to 6 carbon atoms and more preferably 3 or 4 carbon atoms, or a linear alkyl group having from 1 to about 8 carbon atoms, preferably from 1 to 4 carbon atoms and more preferably 1 or 2 carbon atoms, or a cyclic alkyl group having from 5 to about 12 carbon atoms and preferably from 5 to 6 carbon atoms, or an alkaryl or aryl group having from 6 to about 12 carbon atoms, preferably from 6 to about 9 carbon atoms and more preferably 6 or 7 carbon atoms, provided that at least one of the groups selected from R and R' is a branched alkyl, $R^a$ is a hydrogen or an alkyl group, branched or linear, having from 1 to about 7 carbon atoms and preferably from 1 to about 4 carbon atoms.

Examples of dithiocarbamylbenzothiazoles in accordance with the invention include 2-(N,N-diisopropyldithiocarbamyl) benzothiazole and 2-(N,N-diisobutyldithiocarbamyl) benzothiazole.

Dithiocarbamates represent the last category of accelerators in accordance with the invention, when X is a metal ion, and are characterized by the formula

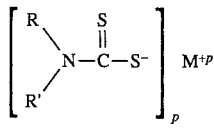

wherein p is an integer of 1–8 and preferably 1–4, M is a metal or quaternary ammonium ion, and each R and R' is independently a branched alkyl group having from 3 to about 8 carbon atoms, preferably from 3 to 6 carbon atoms and more preferably 3 or 4 carbon atoms, or a linear alkyl group having from 1 to about 8 carbon atoms, preferably from 1 to 4 carbon atoms and more preferably 1 or 2 carbon atoms, or a cyclic alkyl group having from 5 to about 12 carbon atoms and preferably from 5 to 6 carbon atoms, or an alkaryl or aryl group having from 6 to about 12 carbon atoms, preferably from 6 to about 9 carbon atoms and more preferably 6 or 7 carbon atoms, provided that at least one of the groups selected from R and R' is a branched alkyl.

Specific examples of dithiocarbamates which can be used in accordance with the invention include bismuth diisobutyldithiocarbamate, cadmium diisopropyldithiocarbamate, copper diisoamyldithiocarbamate, and zinc diisobutyldithiocarbamate, etc.

In each case, the accelerators in accordance with a first aspect of the invention are characterized as compounds containing the dithiocarbamyl moiety wherein at least one branched alkyl group, preferably isopropyl or isobutyl, is attached to the nitrogen of the dithiocarbamyl group. Surprisingly, it has been found that such branched dialkyl dithiocarbamyl compounds not only perform well as accelerators but produce either no or very low levels of N-nitrosamines during the cure, whereas it is well known that the corresponding straight chained dialkyl dithiocarbamyl accelerators produce significant quantities of environmentally undesirable N-nitrosamines. Conventional straight chained dialkyl dithiocarbamyl accelerators typically produce from about 50 ppb to 100 ppb or higher levels of N-nitrosamines by weight based on the total weight of the rubber, whereas the branched alkylthiocarbamyl accelerators of the invention typically produce less than 2 ppb of N-nitrosamines by weight based on the total weight of the cured rubber. The quantity of N-nitrosamines produced depends on the amount of and the particular accelerators used, their molecular weight, and whether they are being used as accelerators in conjunction with elemental sulfur or being used as sulfur donors in the absence of elemental sulfur.

The amount of accelerator used in the sulfur vulcanization of rubber depends upon the components in the rubber formulation and can be readily ascertained without undue experimentation by those skilled in the art. The amount usually is within the range of 0.1 to about 10 parts by weight per 100 parts by weight of vulcanizable rubber. The preferred amount of accelerator employed is generally within the range of from about 0.1 to 5 parts by weight per 100 parts by weight of vulcanizable rubber, and more preferably in the range of from about 0.2 to 2 parts by weight per 100 parts by weight of vulcanizable rubber.

The branched alkyl dithiocarbamyl accelerators of the invention can be used either as the sole accelerator or they may be used in combination with each other or with conventional, accelerators such as 2-mercaptobenzothiazole, 2-mercaptobenzothiazole derivatives and the like to provide an accelerator system having a desired balance of low cost, low nitrosamine formation, and the desired curing and vulcanizate properties. The total amount of accelerator for the mixed accelerator system is the same as set forth above, with the amount of branched dialkyldithiocarbamyl accelerator representing at least about 10 percent and preferably from about 20 to about 70 percent by weight of the total amount of accelerator.

The cycloalkyldithiocarbamyl accelerators in accordance with a second aspect of the invention are characterized by the general formula:

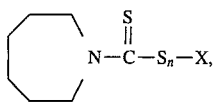

wherein X is a second thiocarbamyl group of the same general structure, a primary amino group, an alkylthio group, a 2-benzothiazyl group, or a metal ion, and n is an integer up to 6 and preferably 1 or 2.

The cycloalkyldithiocarbamyl accelerators are generally similar to the branched alkyldithiocarbamyl accelerators in accordance with the first aspect of the invention, except that the R and R' groups are replaced by a hexamethylene group which forms a seven member structure with the nitrogen atom of the compound. These cycloalkyldithiocarbamyl compounds, like the alkylthiocarbamyl accelerators of the invention, have been found to perform well as vulcanization accelerators and to produce either no or very low levels of nitrosamines during the cure, such as below 2 ppb by weight based on the total weight of the cured rubber. Specific examples of accelerators in accordance with this aspect of the invention include zinc N-hexamethylenedithiocarbamate, N,N'-bis(hexamethylene)thiuram disulfide and monosulfide, and N'-t-butyl-N-hexamethylenethiocarbamyl sulfenamide.

Conventional compounding agents commonly used by those skilled in the art may be incorporated in conventional amounts depending on the rubber used, the application, the physical properties desired, and the curative vulcanized products. Such agents include activators, retarders, vulcanizing and curing agents; protective materials including antioxidants, anti-ozonants, anti-blocking agents, anti-flex cracking agents, flame retarders, fungicides, germicides, anti-static agents, chemical and heat stabilizers; processing materials such as plasticizers and softeners, processing aids and tackifiers; extenders, fillers and reinforcing materials; and the like. Standard compounding ingredients often include zinc oxide, carbon black in an amount of from about 25 to about 150, desirably from about 40 to about 100, and preferably from about 50 to about 90 phr, sulfur, organic sulfur donors, oil, fatty acids, and the like.

The accelerators may be prepared in known manner by reacting the appropriate amines and other moieties with carbon disulfide. The mixture of rubber, vulcanizing agent, accelerator, and other additives may be prepared in conventional mixing equipment such as a Banbury mixer or a roll mill according to standard practice, and vulcanized in a desired shape at elevated temperature under conventional vulcanizing conditions appropriate to the particular article being fabricated such as pneumatic tires or portions thereof.

While the amount of N-nitrosamine formed when vulcanizing a vulcanizable rubber utilizing the accelerators of the invention can vary depending upon a number of factors, the amount of N-nitrosamine formed will nevertheless be less with the accelerators of the invention than for the corresponding conventional accelerators, and generally the cured rubbers formed using the accelerators of the invention will have a N-nitrosamine content of less than 20 ppb or 10 ppb, and typically less than 5 ppb or 2 ppb, and often less than 1 ppb by weight based on the total weight of the cured rubber.

The following examples serve to illustrate the use of the invention, but do not serve to limit it in any way.

TABLE I

| Masterbatch of SBR/BR Rubber | |
|---|---|
| | Parts by Weight |
| Oil Extended Styrene-Butadiene Rubber | 55.0 |
| Styrene-Butadiene Rubber | 25.0 |
| cis-Polybutadiene | 35.0 |
| Zinc Oxide | 3.0 |
| Stearic Acid | 2.0 |
| Carbon Black | 70.0 |
| Petroleum-Based Oil | 20.0 |
| Antiozonant (N-1,3-dimethylbutyl-N'-phenyl-p-phenylenediamine) | |
| Agerite ® * Resin (polymerized dihydroquinoline) | 2.0 |
| | 214.0 |

*Available from the BFGoodrich Chemical Co.

The ingredients of Table I were added in the order indicated and mixed in a Banbury mixer at approximately 270° F. To the above masterbatch formulation were added various accelerators and sulfur to produce examples 1–37 as set forth in Tables II through VII. All component amounts are expressed in parts by weight. For purposes of comparison between conventional accelerators and those of the invention, approximately equimolar amounts of accelerator were used for each of the Examples 1–4 of Table II. Similarly, for purposes of making a fair comparison, equimolar amounts of accelerator were utilized for the sets of examples appearing in Table III through VII.

EXAMPLES 1–6

Various accelerators and sulfur were added as shown in Table II to the masterbatch set forth in Table I. The accelerators and sulfur were added to the masterbatch on the mill at 120° F. The results shown in Table II demonstrate that the accelerators of the invention (tetraisopropylthiuram disulfide, tetraisobutylthiuram disulfide, zinc hexamethylenedithiocarbamate and N,N'-bis(hexamethylene)thiuram disulfide) exhibit good cure characteristics without generating detectable levels of nitrosamine whereas conventional accelerators (tetramethylthiuram disulfide and tetraethylthiuram disulfide) generate undesirably high levels of nitrosamines.

The nitrosamines were analyzed by a gas chromatograph coupled to a thermal energy analyzer, which is specific to nitrosamine detection. Standards of nitrosamines were used to calibrate the instrument before each experimental sample. The lower detection limit for nitrosamines was about 2 ppb or less by weight based on the total weight of the rubber.

TABLE II

| | 1 | 2 | 3 | 4 | 5 | 6 |
|---|---|---|---|---|---|---|
| Masterbatch | 214.0 | 214.0 | 214.0 | 214.0 | 214.0 | 214.0 |
| Sulfur | 2.0 | 2.0 | 1.8 | 1.8 | 2.0 | 2.0 |
| Tetraisopropyl-thiuram disulfide | 1.1 | | | | | |
| Tetraisobutyl-thiuram disulfide | | 1.3 | | | | |
| Tetraethylthiuram disulfide | | | | | 0.9 | |
| Tetramethylthiuram disulfide | | | | | | 0.7 |
| N,N'-bis(hexamethylene)-thiuram disulfide | | | | 1.2 | | |
| Zinc N-hexamethylene-dithiocarbamate | | | 1.4 | | | |
| Mooney Scorch, ML at 280° F. | | | | | | |
| Scorch Time, $t_5$ (min.) | 3.8 | 10.4 | 6.8 | 8.0 | 9.4 | 6.9 |

TABLE II-continued

|  | 1 | 2 | 3 | 4 | 5 | 6 |
|---|---|---|---|---|---|---|
| Cure Time, $t_{35}$ (min.) | 5.3 | 12.4 | 8.5 | 9.9 | 10.9 | 8.2 |
| Cure Index | 1.5 | 2.0 | 1.7 | 1.9 | 1.5 | 1.3 |
| Monsanto Rheometer, 1 degree arc at 320° F. | | | | | | |
| $M_H$-$M_L$, in/lbs. | 23.7 | 27.2 | 23.1 | 25.1 | 26.9 | 26.9 |
| Scorch time ($t_2$), min. | 1.8 | 3.2 | 2.8 | 3.0 | 3.0 | 2.6 |
| Cure time ($t_{50}$), min. | 3.8 | 5.0 | — | — | 4.5 | 3.7 |
| Cure time ($t_{90}$), min. | 8.3 | 10.0 | 8.8 | 8.0 | 7.0 | 6.4 |
| $t_{50}$-$t_2$, min. | 2.0 | 1.8 | — | — | 1.5 | 1.1 |
| Nitrosamines detected | None | None | <2 ppb | None | 20 ppb | 30 ppb |

Examples 7-11 were prepared in accordance with the procedures used to prepare Examples 1-6, using a masterbatch as set forth in Table I. As shown in Table III, known benzothiazole sulfenamide accelerators (examples 7 and 11) were compared to two thiuram disulfides of the invention (Examples 8 and 9) and to a conventional thiuram disulfide (Example 10). The results listed in Table III show that known benzothiazole sulfenamides and conventional thiuram disulfides produce very large quantities of nitrosamines as compared to the branched alkyldithiocarbamyl accelerators of the invention.

TABLE III

|  | 7 | 8 | 9 | 10 | 11 |
|---|---|---|---|---|---|
| Masterbatch | 214.0 | 214.0 | 214.0 | 214.0 | 214.0 |
| Sulfur | 2.0 | 2.0 | 2.0 | 2.0 | 2.0 |
| N,N-diisopropyl-2-benzothiazole sulfenamide (control) | 1.5 | | | | |
| Tetraisopropylthiuram disulfide | | 1.0 | | | |
| Tetraisobutyl thiuram disulfide | | | 1.16 | | |
| Tetramethylthiuram disulfide | | | | 0.66 | |
| N-oxydiethylene-2-benzothiazole sulfenamide (control) | | | | | 1.43 |
| Mooney Scorch, ML at 280° F. | | | | | |
| Scorch time, $t_5$ (min.) | 27.6 | 5.9 | 10.6 | 7.0 | 21.9 |
| Cure time, $t_{35}$ (min.) | 34.3 | 7.7 | 12.6 | 8.4 | 25.0 |
| Cure index | 6.7 | 1.8 | 2.0 | 1.3 | 3.1 |
| Monsanto Rheometer, 1 degree arc at 320° F. | | | | | |
| $M_H$-$M_L$, in/lbs. | 26.9 | 23.3 | 26.2 | 26.0 | 27.5 |
| Scorch time ($t_2$), min. | 7.9 | 2.6 | 3.3 | 2.7 | 7.0 |
| Cure time ($t_{50}$), min. | 13.4 | 4.2 | 4.7 | 3.6 | 10.0 |
| Cure time ($t_{90}$), min. | 18.5 | 7.8 | 9.0 | 5.6 | 13.9 |
| $t_{50}$-$t_2$, min. | 5.5 | 1.6 | 1.4 | 0.9 | 3.0 |
| Nitrosamines detected | >200 ppb | None | None | >50 ppb | >200 ppb |

Table III also demonstrates that when a secondary branched amine is on a sulfenamide group, it will form nitrosamine as in Example 7, but when a secondary branched amine is incorporated into a dithiocarbamyl group it will not form nitrosamines during the cure as shown in Examples 8-10.

TABLE IV

|  | 12 | 13 | 14 | 15 | 16 | 17 | 18 |
|---|---|---|---|---|---|---|---|
| MASTERBATCH | 214.0 | 214.0 | 214.0 | 214.0 | 214.0 | 214.0 | 214.0 |
| BBTS | .78 |  |  | .78 |  |  |  |
| CBTS |  | .87 |  |  |  |  |  |
| MBTS |  |  |  |  | .55 |  |  |
| CR18 |  |  |  |  |  |  | .78 |
| TIBTD | .66 | .66 | .66 |  |  |  | .65 |
| TIPTD |  |  |  | .57 |  |  |  |
| IBDTC |  |  |  |  | 1.30 |  |  |
| IPDTC |  |  |  |  |  | 1.36 |  |
| SULFUR | 1.7 | 1.7 | 1.7 | 1.7 | 1.7 | 1.7 | 1.7 |
| Mooney Scorch, ML at 280° F. |  |  |  |  |  |  |  |
| Scorch time $t_5$ (min) | 17.0 | 16.8 | 13.9 | 10.9 | 10.0 | 10.2 | 14.5 |
| Cure time $t_{35}$ | 19.2 | 18.6 | 17.0 | 13.2 | 12.5 | 12.7 | 17.7 |
| C.I. | 2.2 | 1.8 | 3.1 | 2.3 | 2.5 | 2.5 | 3.2 |
| Rheometer, 1° arc a 320° F. |  |  |  |  |  |  |  |
| $M_H$–$M_L$ (in/lb) | 24.2 | 23.9 | 22.4 | 22.2 | 19.1 | 17.9 | 22.2 |
| $t_2$ (min) | 5.0 | 5.0 | 4.5 | 3.9 | 4.0 | 3.6 | 4.6 |
| $t_{50}$ (min) | 6.6 | 6.4 | 6.7 | 5.4 | 5.9 | 4.9 | 6.1 |
| $t_{90}$ (min) | 9.6 | 8.9 | 12.7 | 7.8 | 12.8 | 9.2 | 9.2 |
| $t_{95}$ (min) | 11.7 | 12.6 | 16.4 | 9.2 | 17.3 | 11.6 | 11.3 |
| CRI | 19.7 | 22.8 | 11.3 | 22.8 | 10.9 | 16.7 | 19.7 |
| $t_{50}$–$t_2$ (min) | 1.6 | 1.4 | 2.2 | 1.5 | 1.9 | 1.3 | 1.5 |
| $t_{90}$–$t_2$ (min) | 4.6 | 3.9 | 8.2 | 3.9 | 8.8 | 5.6 | 4.6 |
| Stress-Strain, Cured $t_{95+2}$, at 320° F. |  |  |  |  |  |  |  |
| Tensile, psi | 2314 | 2588 | 2081 | 1926 | 1743 | 2363 | 2949 |
| % Elongation | 459 | 507 | 453 | 430 | 439 | 632 | 571 |
| 300% Modulus, psi | 1273 | 1257 | 1142 | 1135 | 973 | 761 | 1185 |
| Nitrosamine | None | None | None | None | None | None | Only N-nitroso Morpholine |

BBTS = N-t-butyl-2-benzothiazole sulfenamide
CBTS = N-cyclohexyl-2-benzothiazole sulfenamide
MBTS = mercaptobenzothiazole disulfide
CR18 = N-oxydiethylenethiocarbamyl-N'-oxydiethylene sulfenamide
TIBTD = N,N,N',N'-tetraisobutylthiuram disulfide
TIPTD = N,N,N',N'-tetraisopropylthiuram disulfide
BDTC = zinc dibutyldithiocarbamate
IBDTC = zinc diisobutyldithiocarbamate
IPDC = zinc diisopropyldithiocarbamate

TABLE V

|  | 19 | 20 | 21 | 22 | 23 | 24 | 25 | 26 |
|---|---|---|---|---|---|---|---|---|
| MASTERBATCH* | 171.0 | 171.0 | 171.0 | 171.0 | 171.0 | 171.0 | 171.0 | 171.0 |
| TIBTD | 2.51 | 5.03 | 2.51 | 2.51 |  |  |  |  |
| TBTD |  |  |  |  | 2.51 | 5.03 |  |  |
| BBTS |  |  | 2.93 | 5.86 |  |  |  |  |
| TMTD |  |  |  |  |  |  | 1.43 | 2.86 |
| Mooney scorch, ML at 280° F. |  |  |  |  |  |  |  |  |
| Scorch time, $t_5$ (min) | 3.09 | 8.6 | 36.2 | 51.6 | 6.9 | 5.4 | 4.6 | 3.9 |
| Cure time, $t_{35}$ (min) | 15.3 | 13.0 | 43.0 | 61.5 | 10.3 | 8.1 | 6.4 | 5.0 |
| Cure index | 12.3 | 4.4 | 7.6 | 9.9 | 3.4 | 2.7 | 1.8 | 1.1 |
| Rheometer, 1° arc at 293° F. |  |  |  |  |  |  |  |  |
| $M_H$–$M_L$ (in/lb) | 9.8 | 18.5 | 15.5 | 18.6 | 11.9 | 20.8 | 13.3 | 23.5 |
| $t_2$ (min) | 8.5 | 7.0 | 19.4 | 20.2 | 6.1 | 4.8 | 4.3 | 3.4 |
| $t_{50}$ (min) | 13.7 | 16.2 | 37.4 | 51.6 | 10.3 | 12.0 | 6.7 | 7.0 |
| $t_{90}$ (min) | 30.5 | 33.3 | 61.4 | 74.2 | 23.2 | 25.2 | 18.6 | 20.4 |
| $t_{95}$ (min) | 39.4 | 40.0 | 70.6 | 84.6 | 29.7 | 31.7 | 31.3 | 32.1 |
| CRI | 4.1 | 3.6 | 2.0 | 1.6 | 5.4 | 4.7 | 6.6 | 5.7 |
| $t_{50}$–$t_2$ (min) | 5.2 | 9.2 | 18.0 | 31.4 | 4.2 | 7.2 | 2.4 | 3.6 |
| Stress-strain (psi) |  |  |  |  |  |  |  |  |
| Mins. at 293° F. | 44' | 45' | 76' | 90' | 35' | 37' | 36' | 37' |
| Tensile Strength | 1930 | 3008 | 2453 | 2860 | 2212 | 3489 | 2545 | 3597 |
| % Elongation | 534 | 502 | 510 | 531 | 513 | 525 | 486 | 489 |

TABLE V-continued

|  | 19 | 20 | 21 | 22 | 23 | 24 | 25 | 26 |
|---|---|---|---|---|---|---|---|---|
| 300% Modulus | 712 | 1434 | 1082 | 1277 | 902 | 1604 | 1224 | 1951 |

TIBTD = N,N,N',N'-tetraisobutylthiuram disulfide
TBTD = N,N,N',N'-tetrabutylthiuram disulfide
BBTS = N-t-butyl-2-benzothiazole sulfenamide
TMTD = N,N,N',N'-tetramethylthiuram disulfide
*NR, 100:N234 black, 55:Pine Tar, 5:Zinc Oxide, 8:Steric Acid, 2:6PPD, 1.

TABLE VI

|  | 27 | 28 | 29 | 30 | 31 | 32 | 33 |
|---|---|---|---|---|---|---|---|
| Masterbatch | 214.0 | 214.0 | 214.0 | 214.0 | 214.0 | 214.0 | 214.0 |
| Sulfur | 1.75 | 1.80 | 1.75 | 1.75 | 1.75 | 1.85 | 1.75 |
| CBTS | 1.40 | 1.05 | 1.05 | 1.05 | 1.05 | .070 | .070 |
| TIBTM |  | .25 |  |  |  | .50 |  |
| ZNIBDTC |  |  | .30 |  |  |  | .60 |
| TIBTD |  |  |  | .26 |  |  |  |
| TMTD |  |  |  |  | .15 |  |  |
| NDIBA (ppb) |  | 0 | 0 | 0.6 | 0 | 2.3 | 2.1 |
| NDMA (ppb) |  |  |  |  | 58 |  |  |

CBTS = N-cyclohexyl-2-benzothiazole sulfenamide
TIBTM = N,N,N',N'-tetraisobutylthiuram monosulfide
ZNIBDTC = zinc diisobutyldithiocarbamate
TIBTD =N,N,N',N'-tetraisobutylthiuram disulfide
TMTD = N,N,N',N'-tetramethylthiuram disulfide
NDIBA = nitrosodiisobutylamine
NDMA = nitrosodimethylamine
*All recipes cured at 320° F. for 12 min.

TABLE VII

|  | 34 | 35 | 36 | 37 | 38 | 39 |
|---|---|---|---|---|---|---|
| Masterbatch | 214.0 | 214.0 | 214.0 | 214.0 | 214.0 | 214.0 |
| Sulfur | 1.75 | 1.75 | 1.93 | 1.75 | 1.75 | 1.75 |
| CBTS | .070 | .070 |  |  |  |  |
| TIBTM |  |  | 1.00 |  |  |  |
| ZNIBDTC |  |  |  | .125 |  |  |
| TIBTD | .52 |  |  |  | 1.08 |  |
| TMTD |  | .30 |  |  |  | .74 |
| NDIBA (ppb) | 0.8 | 0 | 2.0 | 0 | 1.9 |  |
| NDMA (ppb) | — | 96 | — | — | — | 99 |

*All recipes cured at 320° F. for 12 min.

Table IV shows that a variety of dithiocarbamyl compounds in accordance with the invention do not produce detectable quantities of nitrosamines, yet exhibit good cure properties.

Table V shows that the branched dialkyldithiocarbamyl compounds of the invention have excellent cure properties even when used without sulfur.

Tables VI and VII show that the thiuram mono and disulfides and the zinc diisobutyldithiocarbamate produce orders of magnitude lower levels of nitrosamine relative to that generated by the conventional unbranched tetramethylthiuram disulfide accelerator.

While in accordance with the Patent Statutes, the best mode and preferred embodiment has been set forth, the scope of the invention is not limited thereto, but rather by the scope of the attached claims.

What is claimed is:

1. A composition comprising an unsaturated sulfur vulcanizable rubber, and an accelerator which abates N-nitrosamine formation during curing, the accelerator being represented by the formula:

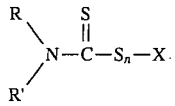

where R is a branched alkyl group having from 4 up to 6 carbon atoms, R' is an alkyl group which may or may not be branched or an alkaryl or aryl group or a cyclic alkyl group; X is another thiocarbamyl group of the structure

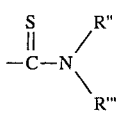

or an alkylthio group; n is an integer from 1 to 6; and

R" is a branched alkyl group having from 4 to 6 carbon atoms, and R'" is a linear or branched alkyl group having up to 8 carbon atoms, a cyclic alkyl group having from 5 to about 12 carbon atoms or an alkaryl or aryl group having from 6 to about 12 carbon atoms.

2. The composition of claim 1, further comprising a sulfur vulcanizing agent wherein X is said thiocarbamyl group, and wherein the accelerator is represented by the formula:

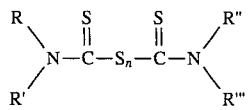

wherein R" is a branched alkyl group having from 4 to 6 carbon atoms, and R'" is a linear or branched alkyl group having up to 8 carbon atoms, a cyclic alkyl group having from 5 to about 12 carbon atoms or an alkaryl or aryl group having from 6 to about 12 carbon atoms, and n is an integer of from 1 to 6.

3. The composition of claim 2, wherein R and R" are isobutyl groups.

4. The composition of claim 2, wherein the accelerator is N,N,N',N'-tetraisobutylthiuram monosulfide or N,N,N',N'-tetraisobutylthiuram disulfide.

5. The composition of claim 1, wherein X is an alkylthio group, and wherein the accelerator is represented by the formula:

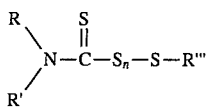

where R' and R''' are each independently a branched or linear alkyl group having up to 8 carbon atoms, a cyclic alkyl group having from 5 to about 12 carbon atoms, or an alkaryl or aryl group having from 6 to about 12 carbon atoms, and n is an integer from 1 to 6.

6. The composition of claim 5, wherein R is an isobutyl group.

7. The composition of claim 1, further comprising a second accelerator, the first accelerator representing at least 20 percent of the total amount of accelerator by weight, the total amount of accelerator being in the range of from about 0.1 to about 10 parts by weight per 100 parts by weight of vulcanizable rubber.

8. A rubber vulcanization process with substantially reduced formation of environmentally undesirable N-nitrosamine compounds, comprising the steps of compounding a composition comprising, a sulfur vulcanizable unsaturated rubber, sulfur vulcanizing agent, and an accelerator which abates N-nitrosamine formation during vulcanization, said accelerator having the formula:

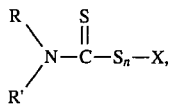

where R is a branched alkyl group having from 4 up to 6 carbon atoms, R' is an alkyl group which may or may not be branched or a cyclic alkyl group or an alkaryl or aryl group; X is another thiocarbamyl group of the structure

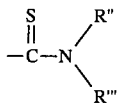

or an alkylthio group; n is an integer from 1 to 6; and
R" is a branched alkyl group having from 4 to 6 carbon atoms, and R''' is a linear or branched alkyl group having up to 8 carbon atoms, a cyclic alkyl group having from 5 to about 12 carbon atoms or an alkaryl or aryl group having from 6 to about 12 carbon atoms; and forming and vulcanizing the composition in a desired shape, the vulcanized rubber having a N-nitrosamine content of less than 10 ppb by weight based on the total weight of the vulcanized rubber.

9. The vulcanization process of claim 8, wherein R is an isobutyl group.

10. The vulcanization process of claim 8, wherein X is said thiocarbamyl group, and wherein the accelerator is represented by the formula:

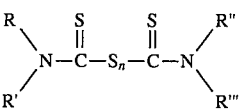

wherein R" is a branched alkyl group having from 4 to 6 carbon atoms, and R''' is a linear or branched alkyl group having up to 8 carbon atoms, a cyclic alkyl group having from 5 to about 12 carbon atoms or an alkaryl or aryl group having from 6 to about 12 carbon atoms, and n is an integer of from 1 to 6.

11. The vulcanization process of claim 10, wherein R and R" are isobutyl groups.

12. The vulcanization process of claim 10, wherein the accelerator is N,N,N',N'-tetraisobutylthiuram monosulfide or N,N,N',N'-tetraisobutylthiuram disulfide.

13. The vulcanization process of claim 8, wherein X is a primary amino group, and wherein the accelerator is represented by the formula:

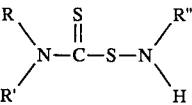

wherein R" is an alkyl group which may or may not be branched or a cyclic alkyl, or an alkaryl or aryl group.

14. The vulcanization process of claim 13, wherein R is an isobutyl group.

15. The vulcanization process of claim 13, wherein the accelerator is N,N-diisobutylthiocarbamyl-N'-t-butyl sulfenamide.

16. The vulcanization process of claim 8, wherein X is an alkylthio group, and wherein the accelerator is represented by the formula:

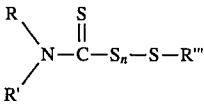

where R' and R''' are each independently a branched alkyl group having from 3 to 8 carbon atoms, a cyclic alkyl group having from 5 to about 12 carbon atoms, or an alkaryl or aryl group having from 6 to about 12 carbon atoms, and n is an integer from 1 to 6.

17. The vulcanization process of claim 8, further comprising the step of utilizing a second accelerator, the first accelerator representing at least 20 percent of the total amount of accelerator by weight, the total amount of accelerator being in the range of from about 0.1 to about 10 parts by weight per 100 parts by weight of vulcanizable rubber.

18. A cured rubber composition having a nitrosoamine content of less than 10 ppb by weight based on the total weight of the vulcanizate, comprising the vulcanization product of an unsaturated sulfur vulcanizable rubber, a sulfur vulcanizing agent and an accelerator represented by the formula:

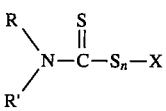

where R is a branched alkyl group having from 4 up to 6 carbon atoms, R' is an alkyl group which may or may not be branched or a cyclic alkyl group or an alkaryl or aryl group;

X is another thiocarbamyl group of the structure

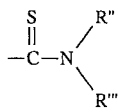

or an alkylthio group; n is an integer from 1 to 6; and

R" is a branched alkyl group having from 4 to 6 carbon atoms, and R'" is a linear or branched alkyl group having up to 8 carbon atoms, a cyclic alkyl group having from 5 to about 12 carbon atoms or an alkaryl or aryl group having from 6 to about 12 carbon atoms.

19. A composition according to claim 1 being free of elemental sulfur.

20. A method of making a vulcanized rubber article having less than 10 parts per billion by weight of N-nitrosamine based on the total weight of the vulcanized rubber, the method comprising: utilizing, with a sulfur vulcanizable unsaturated rubber and a sulfur vulcanizing agent, an accelerator of the formula

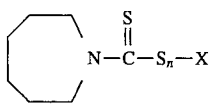

where X is another thiocarbamyl group of the structure

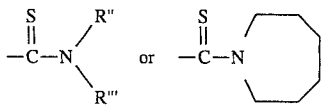

or an alkylthio group; n is an integer from 1 to 6; and

R" is a branched alkyl group having from 4 to 6 carbon atoms, and R'" is a linear or branched alkyl group having up to 8 carbon atoms, a cyclic alkyl group having from 5 to about 12 carbon atoms or an alkaryl or aryl group having from 6 to about 12 carbon atoms; and forming and vulcanizing in a desired shape.

21. A method as set forth in claim 20, wherein X is another thiocarbamyl group, and wherein the accelerator is represented by the formula:

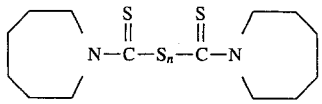

where n is an integer from 1 to 6.

22. A method as set forth in claim 21, wherein the accelerator is N,N'-bis(hexamethylene)thiuram disulfide or N,N'-bis(hexamethylene)thiuram monosulfide.

23. A method as set forth in claim 20, wherein X is an alkylthio group and wherein the alkyl of said alkylthio group is a branched, linear or cyclic alkyl, or an alkaryl or aryl group.

24. A composition comprising a sulfur vulcanizable unsaturated rubber, a sulfur vulcanizing agent and an accelerator which abates N-nitrosamine formation during curing, the accelerator being represented by the formula:

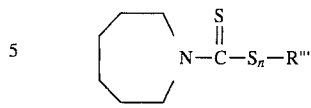

where R'" is a branched, linear or cyclic alkyl, or an alkaryl or aryl group, and n is an integer from 1 to 6.

25. The composition according to claim 1, wherein said accelerator comprises N,N,N',N'-tetraisobutylthiuram monosulfide present as at least 20 percent of the total accelerator by weight and said composition further comprises a second accelerator being 2-mercaptobenzothiazole, benzothiazyl disulfide, N-t-butyl-2-benzothiazyl, or N-cyclohexyl-2-benzothiazyl sulfenamide, and wherein the total accelerator amount is from about 0.1 to about 10 parts by weight per 100 parts by weight of vulcanizable rubber.

26. The composition according to claim 25, wherein said N,N,N',N'-tetraisobutylthiuram monosulfide increases the scorch safety by retarding the onset of cure for said second accelerator and also accelerates the cure rate of said second accelerator after the onset of cure.

27. The composition of claim 26, wherein said second accelerator comprises 2-mercaptobenzothiazole.

28. The composition of claim 26, wherein said second accelerator comprises benzothiazyl disulfide.

29. The composition of claim 26, wherein said second accelerator is N-t-butyl-2-benzothiazyl.

30. The composition of claim 26, wherein said second accelerator comprises N-cyclohexyl-2-benzothiazyl sulfenamide.

31. A process for using a thiuram monosulfide in a rubber formulation to retard the onset of cure and to accelerate the cure rate comprising a) mixing at least an unsaturated sulfur vulcanizable rubber with a N,N,N'N'-tetraisobutylthiuram monosulfide and at least one second accelerator which is 2-mercaptobenzothiazole, benzothiazyl disulfide, N-t-butyl-2-benzothiazyl or N-cyclohexyl- 2-benzothiazyl sulfenamide forming a rubber formulation, and b) vulcanizing said rubber formulation.

32. The process according to claim 31, wherein the total accelerator amount is from about 0.1 to about 10 parts by weight per 100 parts by weight of vulcanizable rubber.

33. The process according to claim 32, wherein said at least one accelerator is 2-mercaptobenzothiazole.

34. The process according to claim 32, wherein said second accelerator is benzothiazyl disulfide.

35. The process according to claim 32, wherein said second accelerator is N-t-butyl-2-benzothiazyl.

36. The process according to claim 32, wherein said second accelerator is N-cyclohexyl-2-benzothiazyl sulfenamide.

* * * * *